April 24, 1951  J. D. SHAW ET AL  2,549,939
THREADED FASTENING DEVICE
Filed June 16, 1944  2 Sheets-Sheet 1
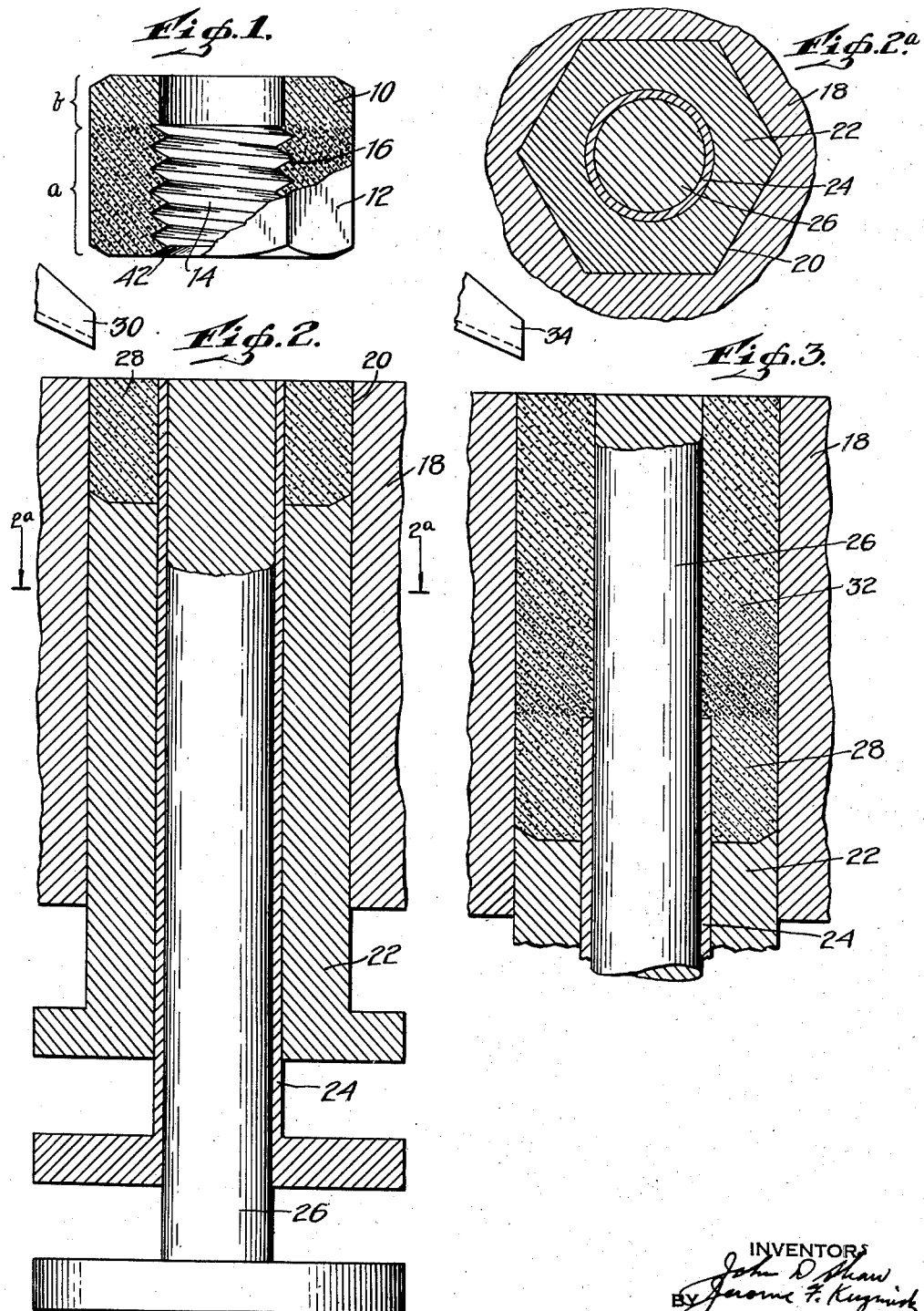

April 24, 1951 J. D. SHAW ET AL 2,549,939
THREADED FASTENING DEVICE
Filed June 16, 1944 2 Sheets-Sheet 2
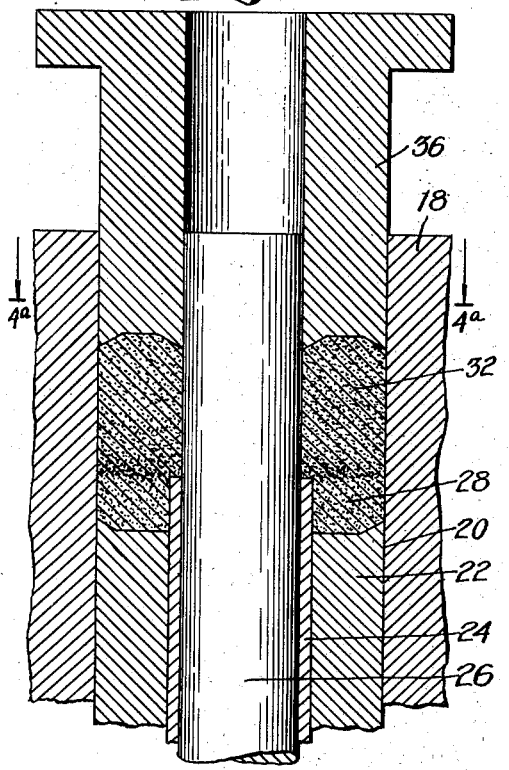
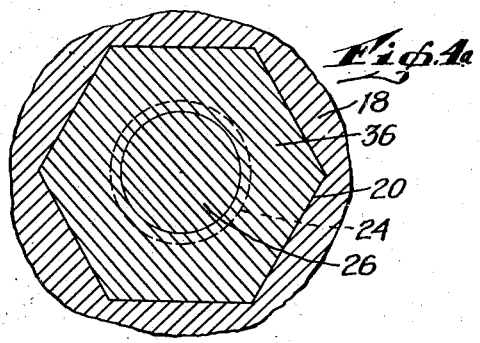
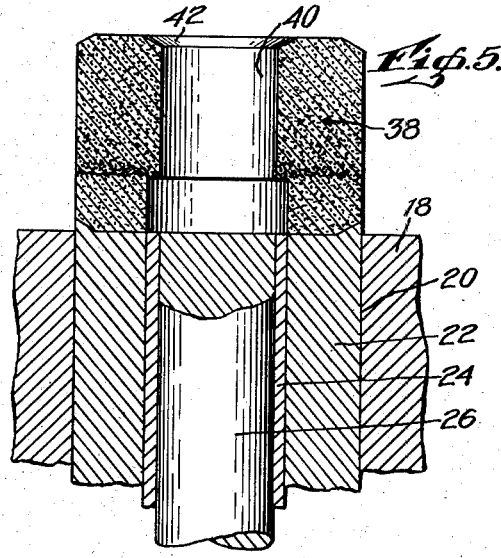
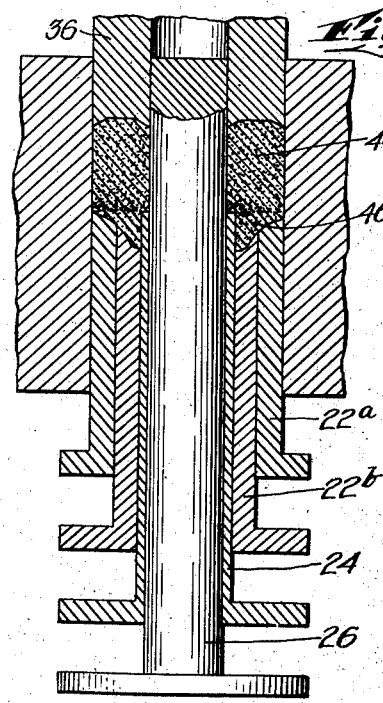
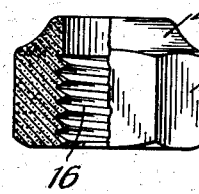
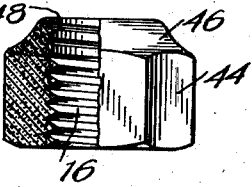

Patented Apr. 24, 1951

2,549,939

UNITED STATES PATENT OFFICE 2,549,939

THREADED FASTENING DEVICE

John D. Shaw, Totowa, and Jerome F. Kuzmick, Passaic, N. J., assignors, by mesne assignments, to Elastic Stop Nut Corporation of America, Union Township, N. J., a corporation of New Jersey Application June 16, 1944, Serial No. 540,618

10 Claims. (Cl. 151—7)

The present invention relates to threaded fastening devices and has particular reference to self-locking devices of the kind in which two threaded elements such as a bolt and a nut are held against undesired relative turning movement by pressure engagement, specifically gripping engagement, between the threads of the cooperating elements. The invention is particularly applicable to the production of self-locking nuts and will hereinafter be explained and discussed in connection with the production of such articles, but it is to be understood that in its broader aspects the invention is not limited to self-locking nuts.

Self-locking nuts of the kind in which the bolt thread is grippingly engaged by an insert of elastic material fixed in the body of the nut and in which a thread is impressed by the bolt thread, have for some years been employed with a high degree of success. Heretofore, however, such nuts have been limited in their use to relatively low temperature applications since the only materials heretofore found satisfactory have been of a non-metallic nature incapable of withstanding high temperatures without deteriorating to a degree rendering the material ineffective. In order to overcome this deficiency and to produce an all-metal nut capable of withstanding relatively higher temperatures it has previously been suggested that the insert be made of soft metal such as lead or alloys thereof, in which a thread might be impressed by a bolt. Such materials have proved to be useless for the intended purpose since a degree of elasticity is required in the insert material which is not possessed by metals soft enough to have threads impressed in them without injury to the bolt threads making the impression.

Furthermore, nuts of the kind previously provided and involving the employment of locking inserts are relatively expensive because of the number of operations required for their manufacture.

It is accordingly the general object of the present invention to provide a novel form of self-locking threaded fastening device, particularly a nut, which is of all-metal integral one-piece construction, which will provide locking action by pressure engagement between screw threads and which will be cheaper in cost than nuts heretofore produced which provide self-locking action by pressure engagement between threads.

In order to achieve the above general object and other and more detailed objects which will hereinafter appear, the invention contemplates the provision of an integral one-piece metal nut body having a threaded bore comprising what may be termed a normal thread section, and a locking section constituting an extension of the normal thread section. Further, the invention contemplates the provision of a locking section in which the material consists of porous elastic metal, specifically powdered metal, formed to provide a porous elastic metallic body by compacting and sintering operations generally referred to as powder metallurgical operations.

We have found that when powders of elastic metals such as iron, steel, brass, bronze, copper, etc., are properly compacted and sintered, the resultant material may be of such nature that a thread can be impressed therein by the thread of a cooperating bolt or screw without injury to the threads of the latter, while at the same time the elasticity of the porous metal is such as to provide a pressure contact or thread-gripping action on the bolt threads adequate to prevent undesired turning of the nut on the bolt due to vibration. In some instances, where the use to which the nut is to be put does not involve high tensile stresses, porous material of powdered metal and in which a thread can successfully be impressed may in addition be sufficiently strong so that the strength of the threads in the main or normal thread portion of the nut bore is adequate for the intended use, in which event the nut may be of material having a uniform character throughout. For nuts intended to be used where high tensile stresses are involved, powder metal material suitable for making a locking section of desired character will ordinarily not have the required tensile strength to provide adequate holding power in the threads of the main thread section. We have further discovered, however, that powdered metals of different chemical analysis can in many instances be readily and successfully united so that an integral nut body of powdered metal can be formed which will provide a main thread section of relatively high tensile strength metal not suited to have a thread impressed therein and a locking section of metal, the physical characteristics of which permit the successful impression of a thread. Thus for relatively high tensile strength applications the nut may in accordance with one phase of this invention, consist of powdered metals of different chemical analysis united in a manner to be hereinafter more fully explained.

For a more complete understanding of the more detailed nature of the invention and the advantages to be derived from its use, reference may best be had to the ensuing portion of this specification, taken in conjunction with the accompanying drawings, forming a part hereof, in which:

Fig. 1 is a section, partly in elevation, of a nut embodying the invention;

Fig. 2 is a diagrammatic section illustrating means for forming a nut body embodying the invention;

Fig. 2a is a section taken on the line 2a—2a of Fig. 2;

Figs. 3, 4 and 5 are views similar to Fig. 2 showing the parts in different operative positions;

Fig. 4a is a section taken on the line 4a—4a of Fig. 4;

Fig. 6 is a view partly in section and partly in elevation of another form of nut embodying the invention;

Fig. 7 is a view similar to Fig. 2 showing means for forming a nut body of the kind shown in Fig. 6; and Fig. 8 is a sectional view showing still another form of nut embodying the invention.

Referring now more particularly to the drawings, there is illustrated in Fig. 1 a nut embodying the invention and of the kind intended for a relatively high strength application. The nut illustrated is, for the sake of simplicity, shown as being of the ordinary hexagonal exterior configuration although it is to be understood that the external configuration of the nut may be varied as desired within the scope of the invention. The nut shown comprises a body 10 having the wrench-engaging external flats 12 and being provided with a bore 14 threaded with a thread 16 to provide a main thread section a. The thread 16 will ordinarily but not necessarily be what may be termed a normal thread, that is, a thread conforming to any one of the usual thread standards. The portion b of the bore constitutes a locking section which in the present instance is shown unthreaded and having an internal diameter somewhat less than the major diameter of the thread 16. As will readily be seen from the figure, if a bolt or screw is threaded through the thread 16 and the threading is continued until the nut is fully on the bolt, the end of the bolt will be forced through the locking section of the nut and will be forced to impress a thread in that section. Because of the elastic property of the metal and further due to its porous nature, displacement of the metal to permit such impression can take place without involving such stresses as will injure bolt threads of bolts made of the usual metals with which the nut is adapted to cooperate, and the elasticity of the displaced porous metal will provide a thread-engaging action resisting movement of the nut under vibratory forces.

Considering for the moment a nut made of ferrous metal, we have found that a locking section in which threads may be impressed can satisfactorily be made of iron powder which for example may be electrolytic iron of a commercial size of powder particle, as for instance that sold commercially as "100 mesh." Such powder can be made into a suitable body by compacting under pressures within the range of from approximately 50 tons to approximately 150 tons per square inch, preferably under a pressure of about 100 tons per square inch, and thereafter sintering at usual temperatures for such metal, for example between 1700° and 2100° F. Pure iron powder may be employed or iron with small amounts of added carbon may be used. Preferably the carbon content is not over 0.20 percent although in some instances higher percentages of carbon may be employed. For those cases where the locking section is unthreaded and requires the impression of a full thread, the addition of a small quantity of metal such as lead, having a certain lubricating quality, is advantageous in order to reduce the value of the torque required to apply the nut for the first time. Experience has shown that as much as five percent of lead may be added but not over about three percent is usually preferable.

The degree of pressure employed in compacting is of importance, since if the compacting pressure is insufficient the resultant material may be so porous as to have insufficient elastic strength to maintain the desired pressure contact on the bolt. Conversely, if the compacting pressure is too high, the resultant material takes on the characteristics of solid metal made by fusion processes, with the result that it is not sufficiently readily yieldable to permit a thread to be impressed by an ordinary bolt thread without injury to the latter.

Ferrous metal having relatively very low carbon content does not possess high tensile strength characteristics and consequently if the nut were to be made entirely of such material high tensile strength properties could not be imparted to the main thread section 16 which is the section essentially carrying the load. However, the main thread section can readily be formed of ferrous powder having the analysis of a high tensile strength iron or steel, that is, with powder which in addition to the iron content contains sufficient quantities of carbon and if desired other alloying metals such as silicon and manganese to produce the desired physical properties. Such a metal in powder form may readily be united to form an integral mass with a metal suitable for a locking section, by powder metallurgical operations, and this may advantageously be accomplished in accordance with the present invention by steps now to be described.

Referring now to Figs. 2 to 5 there is shown more or less diagrammatically the several steps by which a compacted unit body of different metal powders may rapidly and cheaply be formed by use of a machine of known general type, the mechanical details of which need not be described in order to understand this invention. In these figures 18 represents a die which may be in the form of a plate having a bore 20, the plate being movable to cause the bore to pass a series of stations. For the formation of a hexanogal nut the cross section of bore 20 will be hexagonal. Associated with the plate and moving therewith is a hollow punch 22, of hexagonal external cross section and which closely fits and is reciprocable in the die bore 20. The bore of punch 22 is circular and guides a thin sleeve 24 which in turn guides a central cylindrical punch 26. For the first step, the die and punches are brought to a first filling station with the parts in the relative positions shown in Fig. 2, and the cavity formed between the die 20 and sleeve 24 and bottomed by the end of punch 22 is then filled with metal powder 28 by any suitable feeding mechanism of which many kinds are known and which in the drawing is diagrammatically indicated by the spout 30. By placing the tops of sleeve 24 and punch 26 level with the surface of the die plate the cavity is readily filled evenly, with excess powder being scraped or brushed off. In the present instance the powder 28 is indicated as that for the locking section of the nut.

For the next operation the outer punch 22 and sleeve 24 are moved down together in the die and the resultant cavity above the powder 28 is filled with powder 32, as from spout 34, to form the main thread section of the unit, as shown in Fig. 3. Next, the powders are compressed between the punch 22 and sleeve 24 on the one hand and a second hollow punch 36 on the other hand, the latter punch being externally hexagonal and having a circular bore into which the inner punch or pilot 26 fits. During the compacting operation the volume of the powder will be greatly decreased, the compression ratio being usually of the order of from 2½ to 1, to 3 to 1. Consequently, during the compacting operation, shown completed in Fig. 4, the sleeve 24 is moved relative to the punch 22, so as finally to project beyond this punch only by the distance represented by the bore $b$ of the locking section shown in Fig. 1. While compacting may be accomplished by punch movement at only one end of the nut, best results are usually obtained by simultaneous movement of both punches toward each other.

The compacted "green" nut body 38 is then ejected from the die and stripped from the pilot 26 and sleeve 24 by suitable relative movement of the punch parts as indicated in Fig. 5, after which the punch parts are returned to the positions shown in Fig. 2, ready for a repetition of the cycle.

The "green" nut body is then sintered and thereafter the bore portion 40, the diameter of which is determined by the pilot 26, is threaded to provide the thread 16 of Fig. 1. The purpose of the sleeve 24 is to enable a bore to be formed in the locking section which is slightly larger than the minor diameter of the thread 16. In some cases the bore of the locking section may be as small as the minor thread diameter, in which case the sleeve is not required. It will be understood that the several punch movements will be effected by suitable mechanisms such as cams and it will be evident that numerous different arrangements using either moving or stationary dies may be employed. Also, the two different powders may be compacted by separate operations but both from the standpoint of the number of operations required and of the character of the product at the place of juncture between the two materials, simultaneous compacting is to be preferred. When the two loose powders are simultaneously compacted a certain amount of desirable intermingling appears to take place at the juncture zone so that after sintering there is not such a sharp line of demarkation or joint as might be productive of possible weakness.

In order to reduce the number of operations required to complete the nut the ends of punches 22 and 36 may be shaped as shown to provide a countersink 42 at the end of the threaded bore, and if desired, the usual bevelled ends of the nuts.

In some cases, where material having high tensile strength properties is employed for the nut body, a unit pressure for compacting may be used which is less than that desired for the locking section and in order to reduce the total force required to be exerted by the compacting machine and thus prolong tool and die wear and also enable lighter and cheaper machines and less power to be used, a nut such as is shown in Fig. 6 may be formed by an arrangement as illustrated in Fig. 7. The nut shown has a main hexagonal body portion 44 containing the threaded bore 16, above which is the locking section which is in the form of an annular collar portion 46. The metal in the latter portion may be compacted under higher unit pressure than the former by the use of a split punch arrangement in which the outer punch corresponding to punch 22 of Figs. 2 to 5 is split into an outer part 22$a$ and an inner part 22$b$ which have relative movement with respect to each other, with the compacting being done primarily by movement of the latter part. If the same forces are applied to punches 22$b$ and 36 it will be apparent that punch 22$b$, because of its smaller area, will exert a greater unit pressure and in connection with this it is to be remembered that powder, when being compacted, does not behave as a fluid under pressure, since internal friction in the powder mass and friction between the powder and the walls of the dies and punches enable localized compressive pressures of different values to be built up and maintained in a manner not possible with liquids.

As previously noted, it is not requisite always that two different powders be employed, since for some uses a nut made wholly from low carbon or substantially pure iron may be sufficiently strong or an all brass nut may suffice. In such instances the nut body may be formed by initially charging the entire quantity of powder required, but the die and punches set as in Fig. 3.

It has been found that powders of different metals will sinter together to produce a satisfactory unitary body and within the scope of this invention various combinations may be employed, as for example, a brass or copper locking section with a ferrous metal main body, a brass locking section with a bronze main body, and other combinations. For non-ferrous locking sections brass powder having a copper content in the range of from 60% to 80% has been found to give satisfactory results when compacted at around 50 tons per square inch pressure and sintered at an appropriate temperature for example from 1500°–1700° F. Bronze having a copper content of 90–95% is also usable. Many other kinds and specific analyses of metals may also be found to give satisfactory results.

Particularly in the case of relatively large size nuts the initial impression of a complete thread in the unthreaded bore, when the nut is first applied to a bolt, may require undesirably high torque to be applied to the nut and in order to reduce the amount of torque required to be applied to the nut for the first time, the locking section may be provided with a partial depth thread as indicated at 48 in Fig. 8, this being accomplished by the use of a tap suitably shaped to form a full thread 16 and the partial depth thread 48 as an extension thereof.

In so far as the specific locking feature employed is concerned, other forms of locking sections may be employed, the criterion being that the form and dimensions of the bore of the locking section be such that interference is created between the locking section of the bore and the bolt thread when the bolt is forced through the section by being threaded through the main thread section 16, such interference requiring internal displacement of metal by elastic or plastic movement or both and the bolt being held in tight engagement with the nut by the elastic properties of the metal in pressure engagement with the bolt threads.

Obviously, many variations in article design

What is claimed is:

1. A threaded fastening device comprising a unitary body of compacted and sintered metal powder providing a threaded bore portion for cooperation with a threaded element and a locking section having an opening constituting a continuation of said bore portion and adapted to be traversed by said element, said locking section consisting of metal containing not over approximately five percent lead and said opening being dimensioned to provide interference between the thread of said element and the wall of said opening and to require a displacement of material in said locking section when traversed by said element.

2. A threaded fastening device comprising a unitary body of compacted and sintered metal powder providing a threaded bore portion for cooperation with a threaded element and a locking section having an opening constituting a continuation of said bore portion and adapted to be traversed by said element, said locking section consisting of ferrous metal containing not over approximately five percent lead and said opening being dimensioned to provide interference between the thread of said element and the wall of said opening and to require a displacement of material in said locking section when traversed by said element.

3. A threaded fastening device comprising a unitary body of compacted and sintered metal powder providing a threaded bore portion for cooperation with a threaded element and a locking section having an opening constituting a continuation of said bore portion and adapted to be traversed by said element, said locking section consisting of ferrous metal containing not more than approximately 0.20 percent carbon and approximately three percent lead and said opening being dimensioned to provide interference between the thread of said element and the wall of said opening and to require a displacement of material in said locking section when traversed by said element.

4. A threaded fastening device comprising a unitary body of compacted and sintered metal powder providing a threaded bore portion for cooperation with a threaded element and a locking section having an opening constituting a continuation of said bore portion and adapted to be traversed by said element, said locking section comprising ferrous metal containing not over approximately 0.20 percent carbon and approximately three percent lead, said body portion consisting of ferrous metal having a higher carbon content than that of said locking section and said opening being dimensioned to provide interference between the thread of said element and the wall of said opening and to require a displacement of material in said locking section when traversed by said element.

5. A threaded fastening device comprising a unitary body of compacted and sintered metal powder providing a threaded bore portion for cooperation with a threaded element and a locking section having an opening constituting a continuation of said bore portion and adapted to be traversed by said element, said locking section comprising non-ferrous metal, and said opening being dismensioned to provide interference between the thread of said element and the wall of said opening and to require a displacement of material in said locking section when traversed by said element.

6. A threaded fastening device comprising a unitary body of compacted and sintered metal powder providing a threaded bore portion for cooperation with a threaded element and a locking section having an opening constituting a continuation of said bore portion and adapted to be traversed by said element, said locking section comprising metal having a copper content from between approximately sixty percent to approximately eighty percent and with substantially the remainder zinc, and said opening being dimensioned to provide interference between the thread of said element and the wall of said opening and to require a displacement of material in said locking section when traversed by said element.

7. A threaded fastening device comprising a unitary body of compacted and sintered metal powder providing a threaded bore portion for cooperation with a threaded element and a locking section having an opening constituting a continuation of said bore portion and adapted to be traversed by said element, said locking section consisting of bronze having a copper content in the range of from approximately ninety percent to approximately ninety-five percent and with substantially the remainder tin, and said opening being dimensioned to provide interference between the thread of said element and the wall of said opening and to require a displacement of material in said locking section when traversed by said element.

8. A threaded fastening device comprising a unitary body of compacted and sintered metal powder providing a threaded bore portion for cooperation with a threaded element and a locking section having an opening constituting a continuation of said bore portion and adapted to be traversed by said element, said locking section consisting of non-ferrous metal having a relatively high copper content, said body portion consisting of ferrous metal, and said opening being dimensioned to provide interference between the thread of said element and the wall of said opening and to require a displacement of material in said locking section when traversed by said element.

9. A threaded fastening device comprising a unitary body of compacted and sintered metal powder providing a threaded bore portion for cooperation with a threaded element and a locking section having an opening constituting a continuation of said bore portion and adapted to be traversed by said element, said body consisting of non-ferrous metal having a relatively high copper content, said locking section and the body portion providing a threaded bore having different analyses, and said opening being dimensioned to provide interference between the thread of said element and the wall of said opening and to require a displacement of material in said locking section when traversed by said element.

10. A threaded fastening device comprising a unitary body of compacted and sintered metal powder provided a threaded bore portion for cooperation with a threaded element and a locking section having an opening constituting a continuation of said bore portion and adapted to be traversed by said element, said opening in said locking section comprising a bore provided with a partial depth thread constituting a continuation of the thread in said threaded bore portion, said partial depth thread providing interference between the thread of said element and the wall of said opening whereby to require a displacement of material in said locking section when traversed by said element.

JOHN D. SHAW.
JEROME F. KUZMICK.

REFERENCES CITED

The following references are of record in the file of this patent:

UNITED STATES PATENTS

| Number | Name | Date |
| --- | --- | --- |
| 189,984 | Wright | Apr. 24, 1877 |
| 262,193 | Wootten | Aug. 1, 1882 |
| 1,071,841 | Whitman | Sept. 2, 1913 |
| 2,102,489 | Simmonds | Dec. 14, 1937 |
| 2,275,420 | Clark et al. | Mar. 10, 1942 |
| 2,300,302 | Morin | Oct. 27, 1942 |
| 2,309,828 | Dalby | Feb. 2, 1943 |